April 18, 1944.   B. F. LANGER ET AL   2,346,976
TORQUE MEASURING DEVICE
Filed Aug. 23, 1941
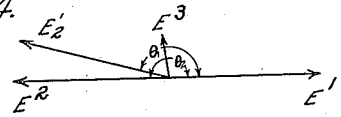
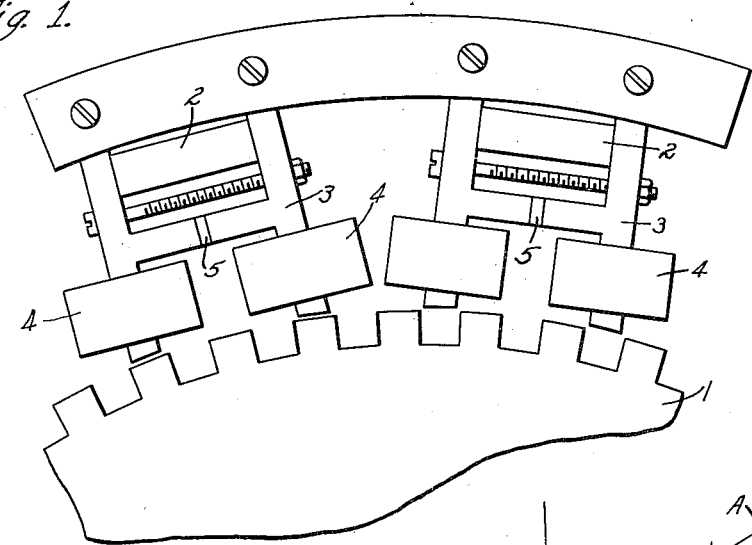
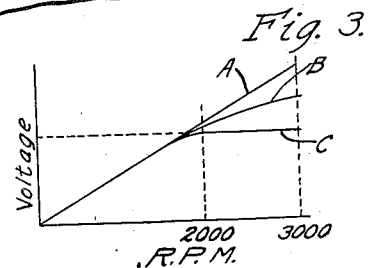
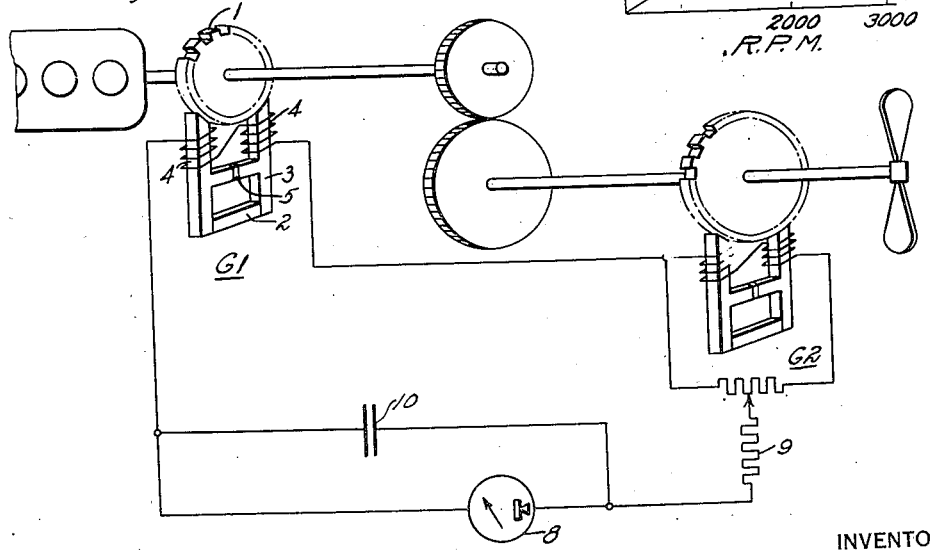
WITNESSES:
INVENTORS
William O. Osbon and
Bernard F. Langer.
BY
Paul E. Friedemann
ATTORNEY Patented Apr. 18, 1944

2,346,976

UNITED STATES PATENT OFFICE 2,346,976

TORQUE MEASURING DEVICE

Bernard F. Langer and William O. Osbon, Pittsburgh, Pa., assignors to Westinghouse Electric & Manufacturing Company, East Pittsburgh, Pa., a corporation of Pennsylvania Application August 23, 1941, Serial No. 408,050

4 Claims. (Cl. 265—25)

Our invention relates to a torsiometer or torque measuring device which is particularly useful in measuring the torque transmitted through an airplane propeller drive system. The invention, however, is not restricted to such system, and may be used wherever the torque transmitted through a shaft or a shaft system is to be measured.

One method of measuring torque transmitted through a shaft is to provide two voltage generating means which are spaced longitudinally of the shaft, and to measure the phase differences between these voltages by a power factor meter, for example. Such measuring device has many disadvantages, such as the heaviness and inefficiency of power factor meters for this purpose, and the sensitivity to frequency of single-phase power factor meters. Also, there is the disadvantage of the necessity of external power in some cases.

An object of our invention is to provide a torque measuring device which is very light, making it adaptable for useage on airplanes.

Another object of our invention is to provide a torque meter which requires no external source of power and which is insensitive to frequency, even though single-phase voltages are generated thereby.

A further object of our invention is to provide a means for eliminating second and third harmonics in the generated voltage used in connection with our power factor meter.

Other objects and advantages will become more apparent from a study of the following specification when considered in conjunction with the accompanying drawing, in which:

Figure 1 is a front partial view of a generator or pick-up unit;

Fig. 2 is a schematic showing of a ship propulsion drive embodying the torque measuring device in accordance with the principles of our invention;

Fig. 3 shows certain characteristics of our torque measuring device; and

Fig. 4 is a vector diagram showing the voltages generated in our system.

In aircraft, it is very important that parts are light and that external power is eliminated wherever possible. A torsiometer or torque measuring device is particularly useful on an airplane, since it is an aid to conserving fuel. Torsiometers using any form of electric strain gauge are apt to be heavy because of the need for a generator or battery to energize the gauge. In accordance with our invention, a gauge is provided which is not only light, but requires no external source of power.

Broadly stated, our invention comprises the generating of two single-phase (or polyphase) voltages, one at the engine side of the gear unit and the other at the propeller side, and the measuring of the elasticity of the gear unit by noting the resultant of these two oppositely disposed voltages which is indicative of the phase difference and of the torque being transmitted.

Fig. 1 shows one of the two generators, say, for example, the one on the engine gear. A toothed disc or wheel 1 is bolted to the engine shaft, and an iron structure, comprising a permanent magnet 2 and laminated or solid soft iron cores 3, are stationarily mounted close to the rotating disc 1. Coils 4 are mounted on the iron cores in such a way that, as the flux changes due to the passage of the teeth past the pole tips, a voltage is generated in the coils. A leakage path through an air gap or non-metallic spacer 5 is provided to reduce the variation of flux in the permanent magnet and to increase the life of the permanent magnet. The purpose of the additional pick-up unit will be described later.

The generator G2 on the propeller shaft is the same as the generator G1 on the engine shaft, except that it has a larger number of teeth in proportion to the gear ratio of the gear unit. Thus for a 3:2 gear reduction and 60 teeth on the engine generator G1, 90 teeth would be required on the propeller generator G2 to make the frequency of the two generators equal. It is not necessary to have the pole pieces confront every other tooth. Two, three teeth or more may be spanned. It is important only to have the pole faces match the toothed projection. Numeral 8 denotes a rectifier-type microammeter.

The vector difference of the generated voltages is proportional to speed as well as to torque, and it is thus a measure of horsepower. Since a measure of torque and not power is desired, the speed effect must be eliminated. This is done by means of resistor 9 and condenser 10. The voltage and frequency of the generated voltages increase together, but as the frequency increases more current is drawn through the condenser, and the current flowing through the microammeter remains practically constant provided the resistor 9 is large compared to the impedance of condenser 10.

Strictly speaking, the current in the microammeter is not a linear function of torque. Assuming equal and opposite generated voltages which are maintained constant in magnitude if E is the magnitude of each of the generated voltages and $\phi$ is the phase angle between them, then the magnitude of the vector difference is $$2 \times E \cos \frac{\phi}{2}$$

As long as $\phi$ is between 90° and 180°, a fairly linear scale results.

Referring to Fig. 3 curve A shows a relationship between voltage generated and speed (or R. P. M.) if no eddy currents are present in the generator. Curve B denotes the characteristic if eddy currents are present by virtue of the use of solid poles instead of laminated poles 3, as described. Curve C denotes the characteristic obtainable from curve B, as modified by the presence of condenser 10 which allows passage of high frequency currents and which thereby keeps the voltage measured by meter 8 substantially constant for a predetermined speed range, say, between 2000 and 3000 R. P. M. as indicated. It is this ability to maintain the voltage substantially constant within a predetermined speed range which makes our meter possible. Assuming a constant torque, if the speed should increase from 2000 to 3000 R. P. M., then the voltage generated by the two generators G1 and G2 as modified by elements 9 and 10 will remain substantially constant. However, within this range, if the torque should increase, the phase angle between the voltage generated by G1 and G2 would change and the resultant voltage E³ would increase (see Fig. 4). It will thus be seen that the magnitude of E³ is, in effect, substantially proportional to the phase angle between voltages E¹ and E²—hence, is indicative of the torque transmitted. A variable resistor 9 is provided either across G1 or G2 dependent upon which is larger (depending upon the diameter of the disc, number of teeth, gear ratio, etc.). By applying the potentiometer to the larger of the two voltages, the voltage output may be made equal to the voltage of the other generator.

Various means can be used to reduce the harmonic content of the generated voltages. In order to eliminate even harmonics; that is, the second, fourth, etc. two pickups are shown on each toothed disc or wheel, as shown in Fig. 1. The second is spaced from the first and confronts a low point instead of a high point of the corresponding tooth so as to have a fundamental phase difference of 180°, and the coils are connected so that the fundamentals of the generated voltages are additive giving a total voltage which is twice the voltage of either generator. With this connection even harmonics generated in the two coils are in phase opposition and cancel out. The third harmonic and its multiples are eliminated by making the peripheral pole width equal to one-third of the tooth pitch. By eliminating the second and third harmonics, we are able to provide a single-phase generator which has a substantially pure sine wave form.

We are, of course, aware that others, particularly after having had the benefit of the teachings of our invention, may devise other devices embodying our invention, and we, therefore, do not wish to be limited to the specific showings made in the drawings and the descriptive disclosure hereinbefore made, but wish to be limited only by the scope of the appended claims.

We claim as our invention:

1. A torque meter for measuring the torque transmitted through a drive shaft system comprising, in combination, voltage generating means including a magnetic pickup having suitable pole faces and a cooperating toothed rotor member for generating a voltage proportional to the speed of rotation of a portion of said system, a second voltage generating means including a magnetic pickup having suitable pole faces and a cooperating toothed rotor member for generating a voltage proportional to the speed of rotation of another portion of said system, the pole faces of each of said magnetic pickups being one-third the pitch of the teeth of said toothed rotor member for minimizing the occurrence of a third harmonic, means for connecting said voltage generating means in opposition, the generated voltages being equal and opposite when no torque is transmitted and at the same frequency, a meter for measuring the resultant of said generated voltages upon a phase displacement thereof due to torque, and a condenser paralleling said meter adapted to bypass generated voltages increasing with frequency over a predetermined frequency range whereby a resultant of said generated voltages is obtained throughout said frequency range which varies substantially only with the phase displacement of said generated voltages.

2. A torque meter for measuring the torque transmitted through a drive shaft system comprising, in combination, voltage generating means including a first and a second voltage generator and a cooperating toothed rotor member for generating a voltage proportional to the speed of rotation of a portion of said system, a second voltage generating means including a first and a second voltage generator and a cooperating toothed rotor member for generating a voltage proportional to the speed of rotation of another portion of said system, said second generator in each said voltage generating means being connected in 180° phase relationship with said first voltage generator for eliminating the occurrence of even harmonics, means for connecting said voltage generating means in opposition, the generated voltages being equal and opposite when no torque is transmitted and at the same frequency, a meter for measuring the resultant of said generated voltages upon a phase displacement thereof due to torque, and a condenser paralleling said meter adapted to bypass generated voltages increasing with frequency over a predetermined frequency range whereby a resultant of said generated voltages is obtained throughout said frequency range which varies substantially only with the phase displacement of said generated voltages.

3. A torque meter for measuring the torque transmitted through a drive shaft system comprising, in combination, voltage generating means including a first and a second magnetic pickup having suitable pole faces and a cooperating toothed rotor member for generating a voltage proportional to the speed of rotation of a portion of said system, a second voltage generating means including a first and a second magnetic pickup having suitable pole faces and a toothed rotor member for generating a voltage proportional to the speed of rotation of another portion of said system, said second magnetic pickup in each of said voltage generating means being connected in 180° phase relationship with the first for eliminating the occurrence of even harmonics, the pole faces of each of said magnetic pickups being one-third the pitch of the teeth of said toothed rotor members for minimizing the occurrence of a third harmonic, means for connecting said voltage generating means in opposition, the generated voltages being equal and opposite when no torque is transmitted and at the same frequency, a meter for measuring the resultant of said generated voltages upon a phase displacement thereof due to torque, and a condenser paralleling said meter adapted to bypass generated voltages increasing with frequency over a predetermined frequency range whereby a resultant of said generated voltages is obtained throughout said frequency range which varies substantially only with the phase displacement of said generated voltages.

4. A torque meter for measuring the torque transmitted through a drive shaft system comprising, in combination, voltage generating means including a first and a second magnetic pickup having suitable pole faces and a cooperating toothed rotor member for generating a voltage proportional to the speed of rotation of a portion of said system, a second voltage generating means including a first and a second magnetic pickup having suitable pole faces and a toothed rotor member for generating a voltage proportional to the speed of rotation of another portion of said system, said second magnetic pickup in each of said voltage generating means being connected in 180° phase relationship with the first for eliminating the occurrence of even harmonics, the pole faces of each of said magnetic pickups being one-third the pitch of the teeth of said toothed rotor members for minimizing the occurrence of a third harmonic, means for connecting said voltage generating means in opposition, the generated voltages being equal and opposite when no torque is transmitted and at the same frequency, a microammeter connected in series with said voltage generating means for measuring the resultant of said generated voltages upon a phase displacement thereof due to torque, a condenser paralleling said microammeter adapted to bypass generated voltage increasing with frequency over a predetermined frequency range whereby a resultant of said generated voltages is obtained throughout said frequency range which varies substantially only with the phase displacement of said generated voltages, and a variable resistor means having a relatively high overall resistance value for balancing the output voltages of said voltage generating means.

BERNARD F. LANGER.
WILLIAM O. OSBON.